Nov. 18, 1958 L. FASTINGER 2,860,427
ELECTRIC IRONING STATION FOR DOMESTIC PURPOSES, FOR
CRAFTSMEN AND FOR INDUSTRIAL PURPOSES
Filed April 27, 1954 10 Sheets-Sheet 3
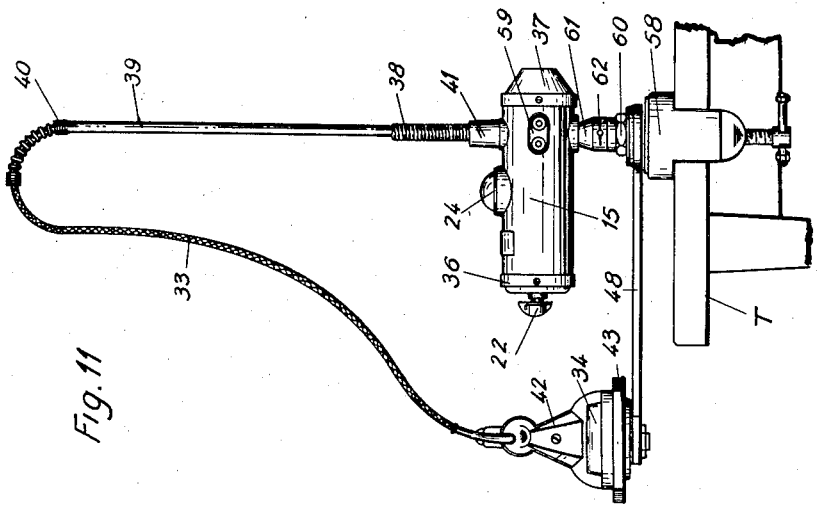
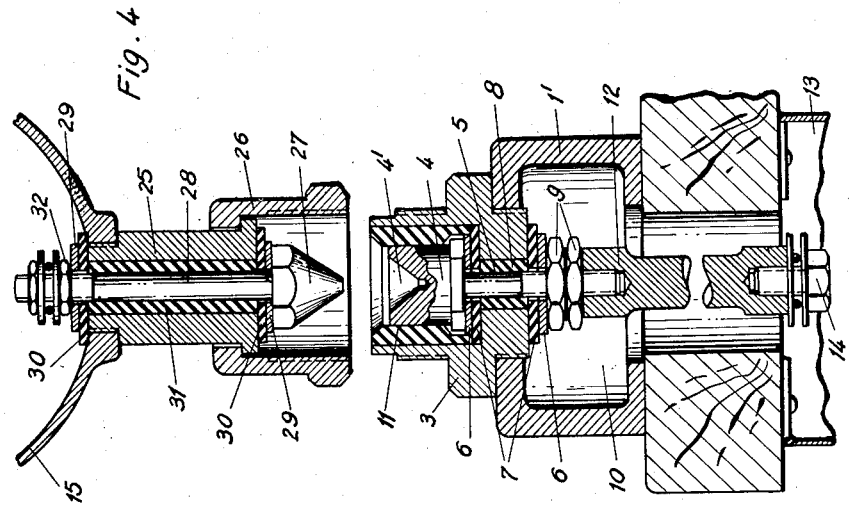

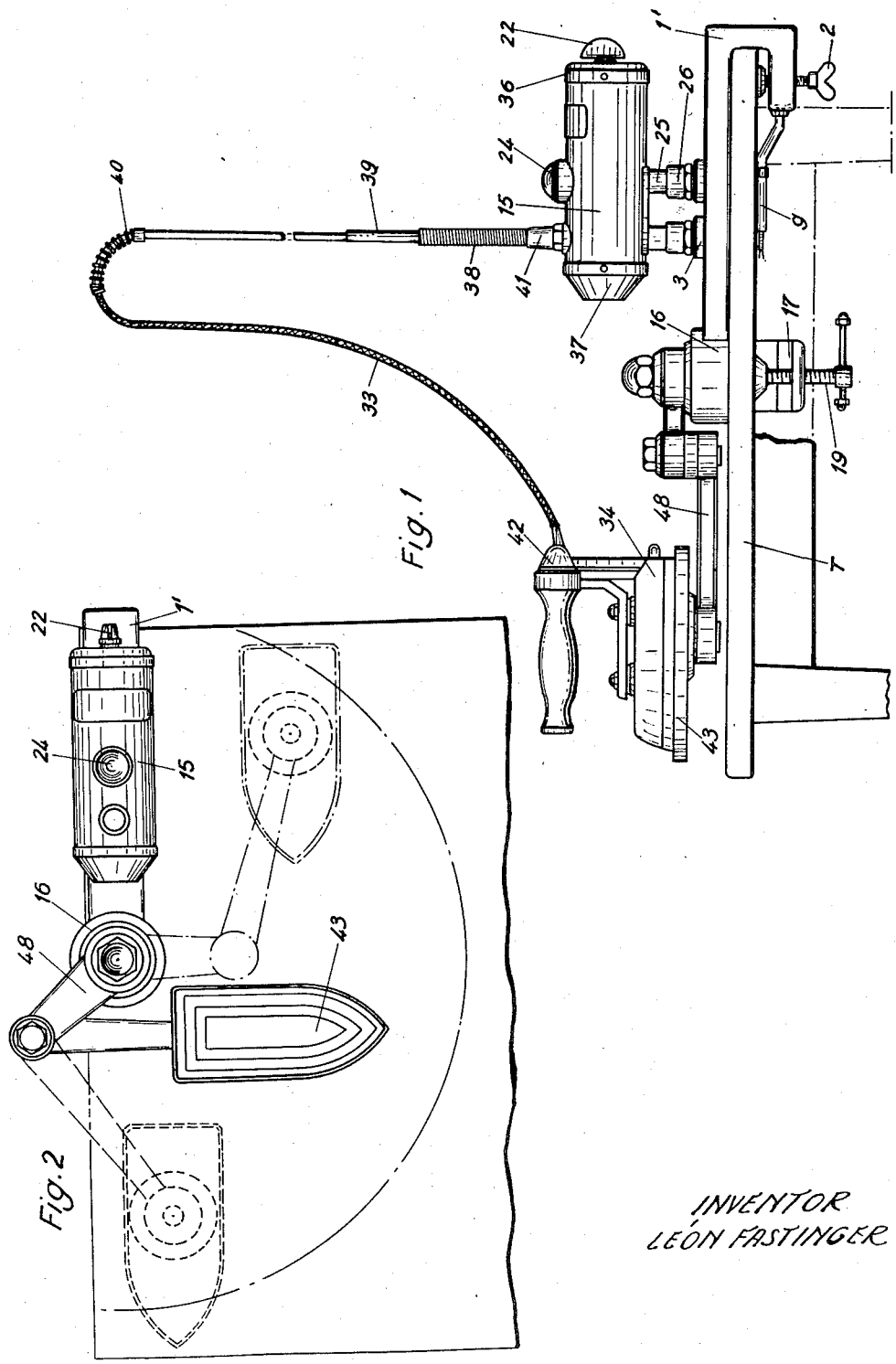

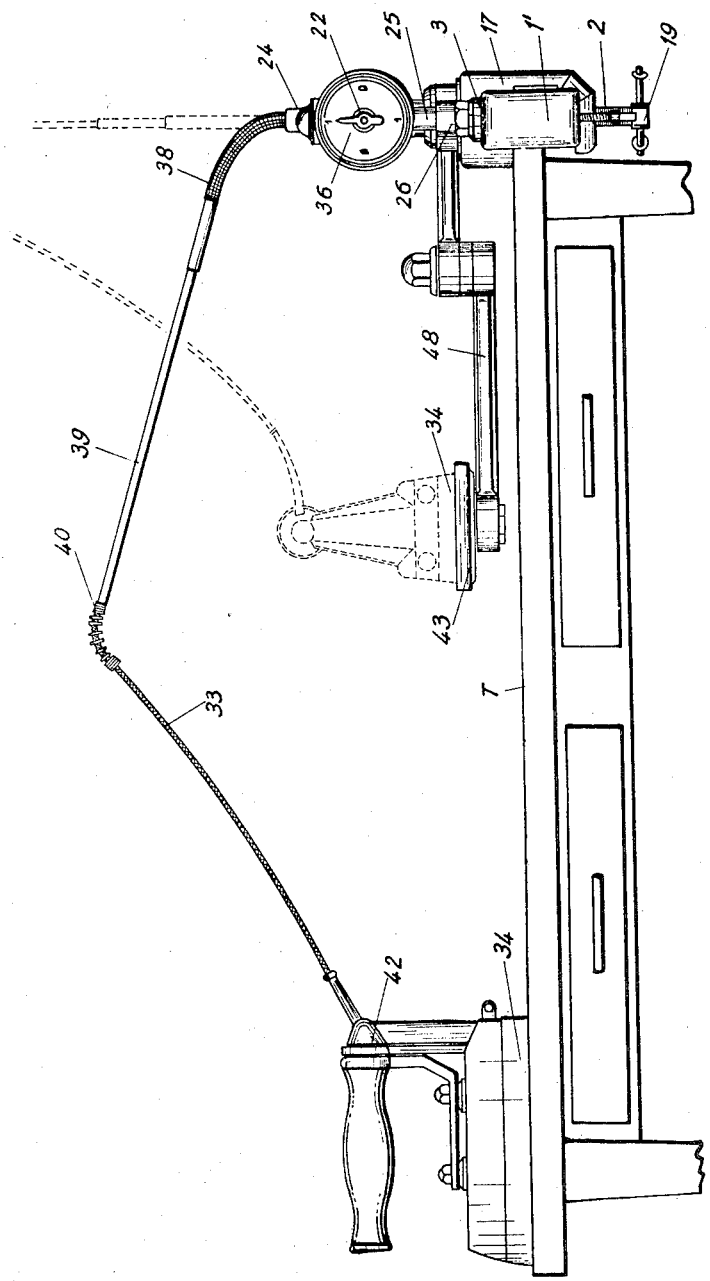

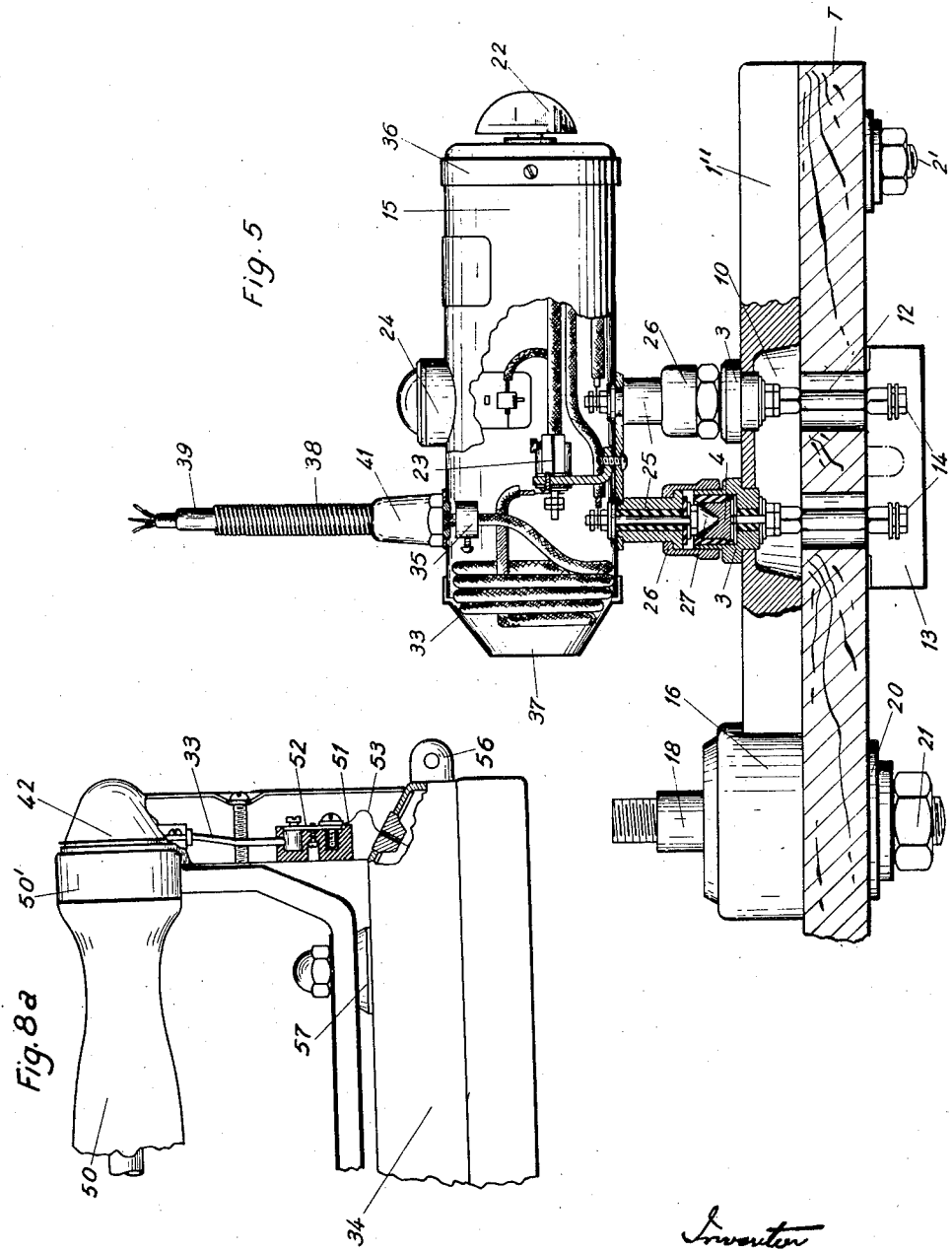

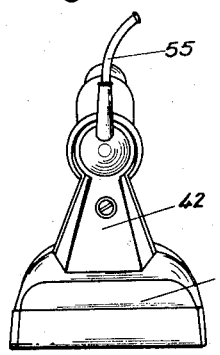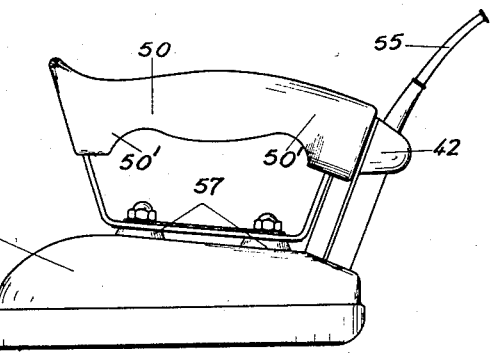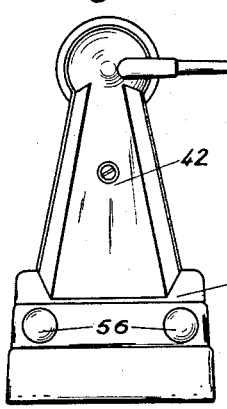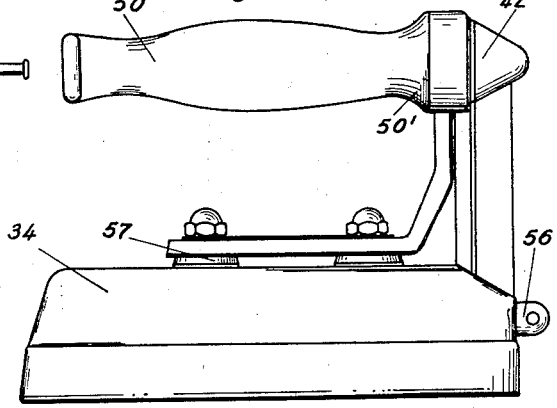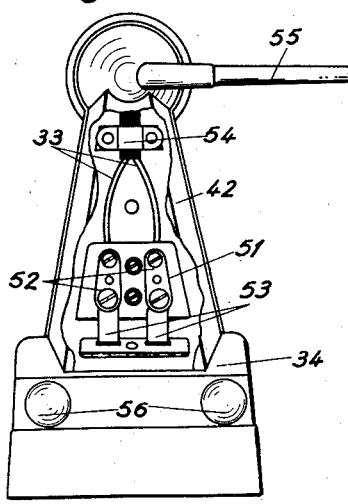

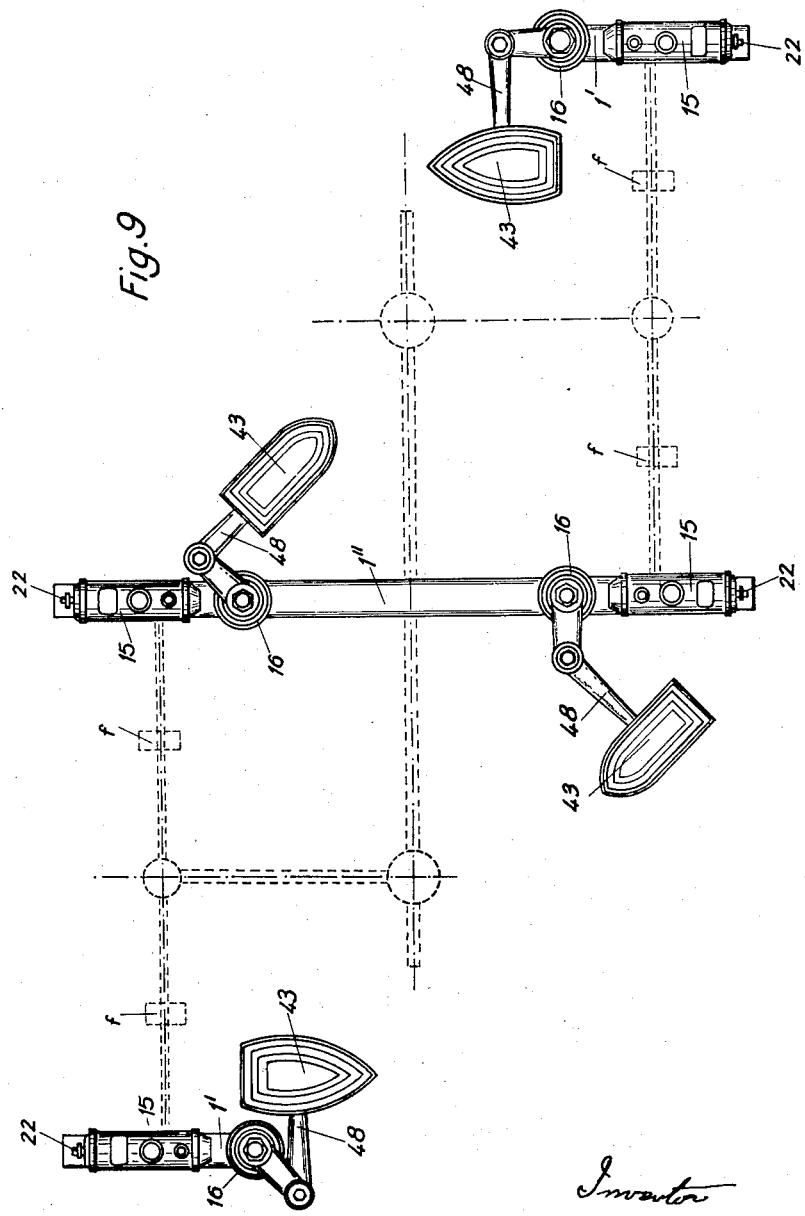

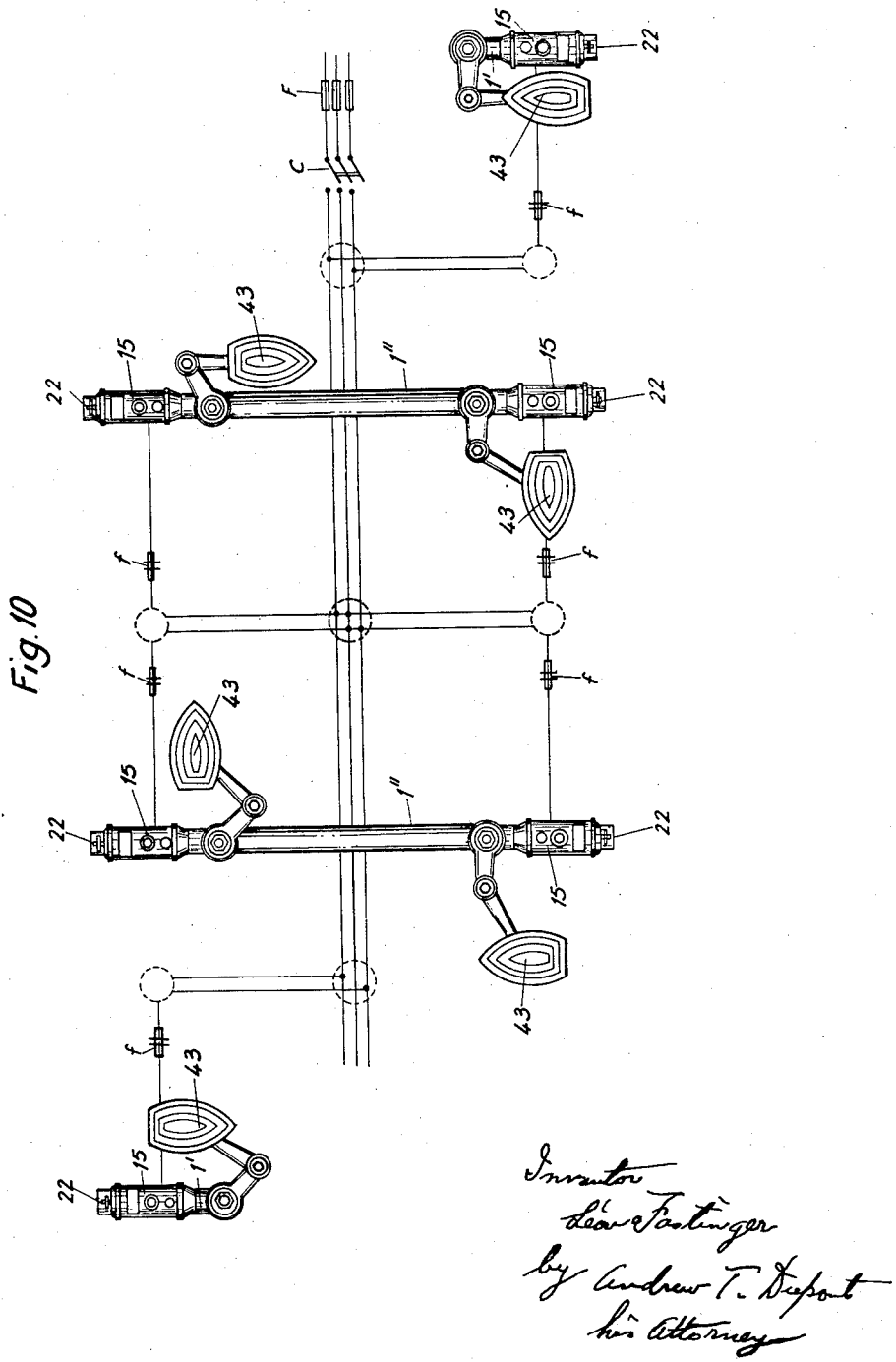

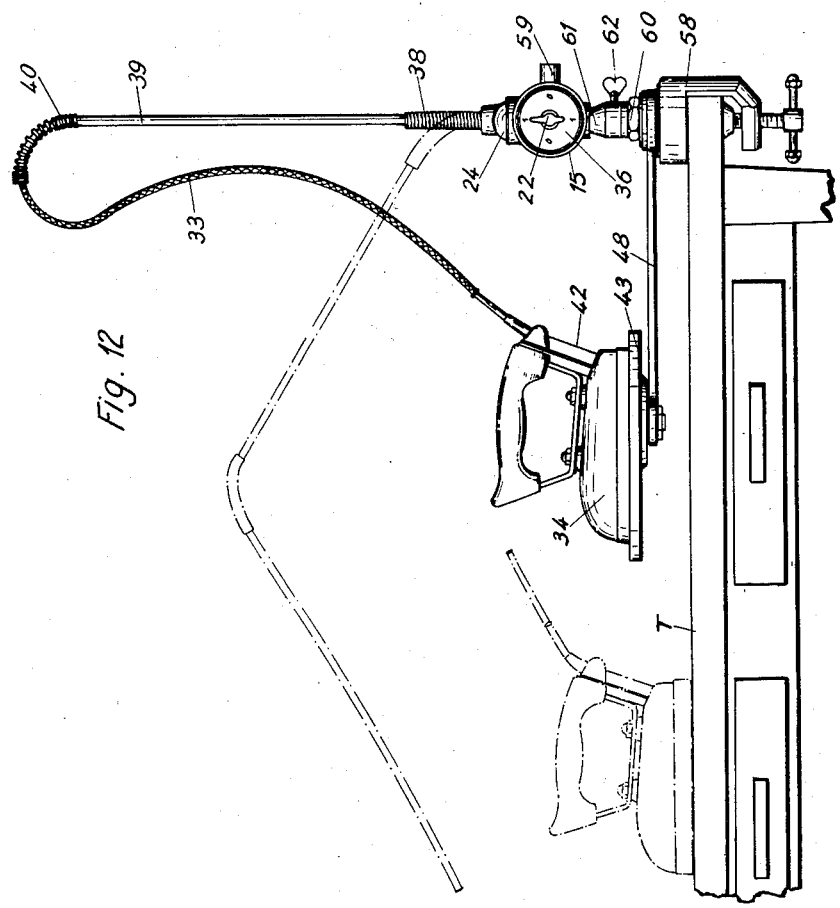

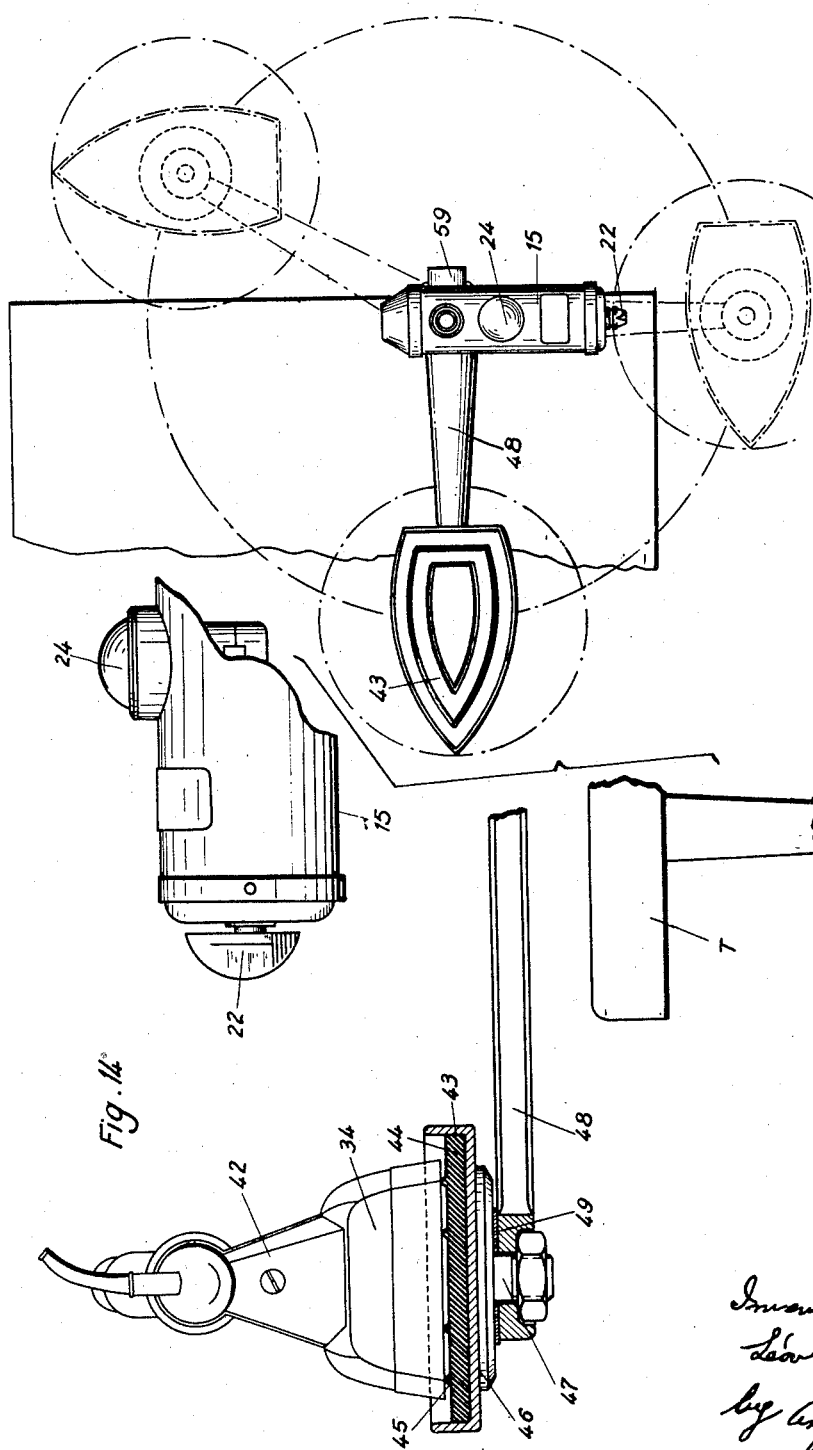

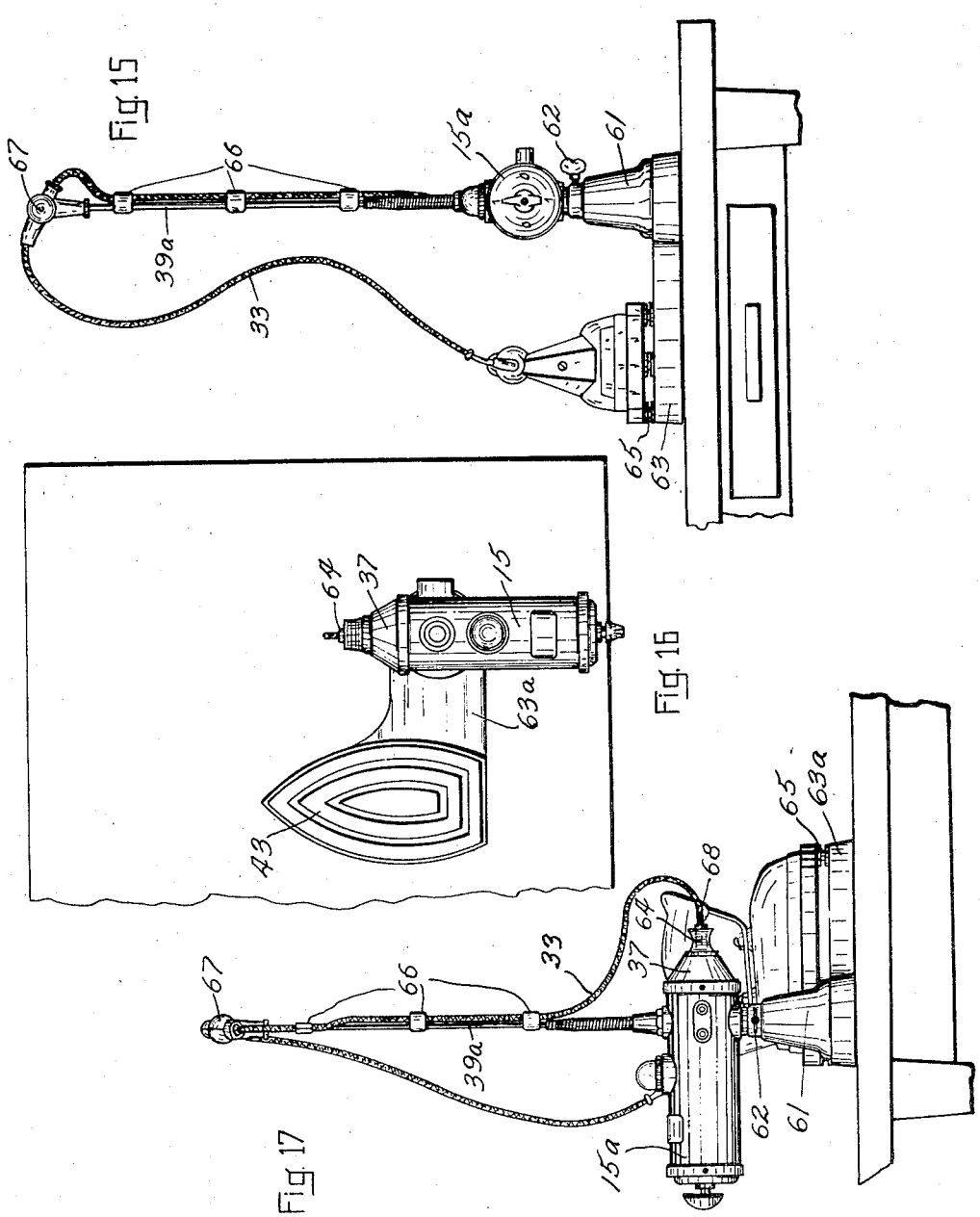

United States Patent Office 2,860,427
Patented Nov. 18, 1958

2,860,427

ELECTRIC IRONING STATION FOR DOMESTIC PURPOSES, FOR CRAFTSMEN, AND FOR INDUSTRIAL PURPOSES

Léon Fastinger, Obernai, France

Application April 27, 1954, Serial No. 426,019

8 Claims. (Cl. 38—142)

My invention has for its object an electric ironing station adapted to provide an easy and reliable ironing, at a low cost price, of linen and garments of any type for households, laundries, tailors and outfitters and also for all linen and garment-making firms.

This novel combined ironing station removes all the drawbacks and inadequate operations appearing in conventional plants while improving to a considerable extent the grade of the ironing work, increasing the yield and reducing the expenditure in current and repair work, along with a complete cutting out of all risks of faulty operation.

A number of embodiments of my invention are described hereinafter, reference being made to accompanying drawings wherein:

Figs. 1, 2 and 3 illustrate an ironing station adapted to be secured temporarily in position and intended for industrial plants and craftsmen, Fig. 1 being a side-view with the laundry iron in its inoperative position, Fig. 2 being a view from above without said iron and showing three different locations of the iron carrier and Fig. 3 being a front view with the iron in its inoperative and operative positions;

Fig. 4 is a cross-section of a unipolar armoured plug positioned on the rail feeding the current on the ironing table and a corresponding armoured unipolar jack with its contacting head carried by the control head, the two parts of the armoured current-feeding means interengaging each other between the rail feeding the current and the control head for the ironing means;

Fig. 5 illustrates the main component parts of an ironing station for industrial purposes or for craftsmen, adapted for permanent securing to a table, i. e. the current-feeding rail and the metallic support rigid with the table, the control head shown partly sectionally as screwed to the rail and to the current-feeding means, said figure including a cross-section of unipolar current-feeding means which are supposed to be operatively positioned, the connecting box being fitted underneath the ironing table;

Figs. 6, 6a, 7 and 7a show two different types of laundry irons for last mentioned plant together with an armored connection box;

Fig. 8 is an end view of the laundry iron, partly broken away, and Fig. 8a is a partial side elevation of the iron, with parts shown in section;

Figs. 9 and 10 show the manner of mounting an ironing table in plan view respectively with four and six permanently secured ironing stations, the actual irons not being shown, while different positions of the iron carrier are shown together with the location of the electric feeding means underneath the table;

Figs. 11, 12 and 13 show a simplified ironing station for households adapted to be temporarily attached, Fig. 11 being a side view with the iron in its inoperative position, Fig. 12 a front view with the iron in its inoperative and operative positions, and Fig. 13 a plan view, without the iron, for three different positions of the iron carrier;

Fig. 14 illustrates various sections of last-mentioned station, to wit: a section of the control head with the switch and the tell-tale lamp incorporated thereto and a part of the iron-carrying arm with a cross-section through the rotary iron carrier;

Figs. 15, 16 and 17 illustrate an example of a portable household ironing station with special belt-tensioning means, to wit: Fig. 15 is a front view, Fig. 16 is a view from above and Fig. 17 is a side view, the three views showing the laundry iron in its inoperative position.

The ironing station intended for industrial purposes and for craftsmen includes chiefly:

A current-feeding rail provided with two armored unipolar current-feeding plugs;

A metal support with a securing spindle;

A control head with various electric parts;

Tensioning means for the table feeding the laundry iron;

A pivotally secured arm for the rotary iron carrier;

A rotary iron carrier;

A special laundry iron.

The feed rail 1′ or 1″ (Figs. 1, 2, 3, and 5) is constituted by a strong metal body such as a quadrangular shaped member constituted either (a) in the case of Figs. 1, 2 and 3 by a member 1′ folded into the shape of a square adapted to be temporarily secured through a winged bolt 2 onto the table T, or else, (b) in the case of Fig. 5, by a rectilinear member 1″ for permanent securing thereof through a threaded bolt 2′ engaging permanently the table T.

These two embodiments of the rails form, as disclosed hereinafter, a carrier member provided for the ironing station and incorporating an armored current-feeding plug, the connection being provided in the first case for temporary operation and in the second case for permanent operation.

The feeding rails 1′ and 1″ carry at a suitable location two metal contact-protecting supports 3 each with an outer thread screwed at a predetermined point into the rail and engaging permanently the latter.

In each of said supports 3 is mounted a solid brass contact piece 4, provided with a central spindle 5 the free end of which is threaded, the said contact piece being inserted with an insulation protecting it against high voltages.

With a view to a proper insulation and to better centering and securing of the contact-piece 4 inside the support 3, there are fitted inside the connection box chamber two brass washers 6, two mica washers 7 and a cylindrical sleeve 8 made of steatite which is fitted in fluidtight relationship with reference to the contact piece.

The different parts are fitted over one another in a suitable sequence over the central spindle 5 and are screwed together in said insulated relationship by means of a nut and of a counter nut 9; the two contact-pieces 4 are made of stress-resisting brass with six sides at the lower extremities and are provided centrally with conical contact-making seats 4′ adapted to receive a cooperating contact-making head of same conicity. These contact-pieces 4 are cut to cylindrical shape along their outer surface over four fifths of their heights, starting from their upper ends and are surrounded each by a cylindrical socket 11 having a thick wall of steatite or Bakelite which in its turn fills completely the interval remaining inside the contact carrier or support so as to ensure as perfectly as possible, the insulation of the contact-piece 4 with reference to the wall of the support 3.

The connection feeding current to the feeding rail for a temporarily secured station (Figs. 1, 2 and 3) is constituted in a manner such as to provide a movable connection with a rubber-covered flexible cable. The cable g connected with the rail 1′ at its bent end passes through a guiding channel formed in said rail, is connected with the free end of each central spindle 5 and is secured through an eye provided at this point so as to absorb the tractional stresses. A current-feeding jack connected with the other end of the yielding cable receives current from a wall plug so as to energize the feeding rail.

The connection with the feed rail in the case of a permanent station (Fig. 5) is of a permanent type and is constituted as follows:

Two sufficiently rigid brass extensions 12 provide at each end with a six-sided section screwed over the free threaded ends of the two central spindles 5 projecting into the connection chamber 10 serve for closing the circuit through the table body; said extensions are connected inside the connection box 13 secured underneath said table body and form with the screw 14 an extremely rigid connection feeding the current. The rail 1' executed in conformity with Fig. 5 provides perfect positioning means adapted to be transported with the ironing table for the current-feeding leads underneath the body of the table.

Each of the embodiments of the current-feeding rail provides, on the ironing table and in the immediate proximity of the work, a circuit connection for the control head 15 through screwing, which connection is of the bipolar armored type and is practically disconnectable (Figs. 1 to 5 and 9 to 14).

The securing of the feed rail 1' or 1" on the ironing table, i. e. at one end thereof, is ensured by a rigid metal support 16 which assumes in the case of Fig. 1 the shape of a vise 17. This metal support 16 is provided with a central pivot 18 which is screw threaded at its upper end and rigidly anchored as shown in Fig. 5 and serves chiefly for carrying the iron-supporting arm described hereinafter. Said support passes with its pivot 18 first through the rail 1' or 1" and then in the case of the rail 1" through the body of the table. In both types of rails 1' and 1", the rail engages the metal support 16 which is undercut for this purpose. The whole arrangement is rigidly screwed onto the table either through a mere screwing of the threaded spindle 19 (Figs. 1 and 3) or else, in the case of the rail illustrated in Fig. 5, through a screwing of the six-sided nut 21 engaging the washers 20.

The control head 15 (Figs. 1 to 5 and 9 to 10) is constituted by a hollow metal body of preferably cylindrical shape inside which are mounted a rigid bipolar switch 22, a bipolar shunt bar 23 (Fig. 5) and a tell-tale lamp 24. Inside the wall of the control head 15 and in diametrically opposed relationship with reference to the lamp, are located on the outside of the head and at a predetermined distance from each other, two metal sockets 25 adapted to protect the contact pieces as shown in Figs. 3, 4 and 5.

Said sockets are provided each with a connecting nut 26 and they are screwed and rigidly anchored inside the head 15. Each of said two sockets carries a contact head 27 made of solid brass and assuming a conical shape, the central spindle 28 of which is threaded at its end, the arrangement being insulated against high voltages. The insulation, the centering and the fixation of each conical contact head 27 on the protecting sleeve 25 are provided in a manner similar to that disclosed with reference to the brass contact-pieces 4, i. e. by means of a brass washer 29, a thick mica washer 30 and a cylindrical steatite sleeve 31 fluidtightly fitted in the arrangement, said parts being also fitted in a suitable sequence over the central spindle 28 so as to hold fast the protecting sleeve 25 and they are secured inside the control head 15 by screwing the six-sided nut 32 over the spindle 28. The two contact-making heads 27 are provided each with a six-sided end wherethrough they may be fastened, and a conical tip at 60°, and are fitted accurately as to distance and to tapering inside the contact-making seat 4' cut in the contact piece 4 and they are adapted to be fed with current from the table and to transmit it into the control head 15.

The two connecting nuts 26 which are screwed in their turn into the contact-protecting supports 3, i. e. on the outer thread of the latter, serve on one hand for screwing home and perfectly protecting the passage of current and, on the other hand, for rigidly securing the control head 15 onto the feeding rail 1' or 1" (Figs. 1 and 5). This current feeding system provided with an inner conical interengagement, which is adapted to be screwed and is perfectly insulated, forms a perfect armored system. It provides means for a rapid mounting of the control head 15 together with a perfect transmission of current without any risk of heating to an excessive extent even for large intensities.

A switch 22 within easy reach of the operator allows making and breaking the circuit in an easy manner. The tell-tale lamp indicates in a visible manner the location of the switch and completes the means for obtaining a reliable operation of the ironing station.

The electric current passes through the electric system inside the control head 15, starting from the conical contact-making heads 27 through the agency of the bipolar switch 22, towards the shunt bar 23 which, on the other hand, feeds current to the tell-tale lamp 24 and into the cable 33 feeding the laundry iron 34. Said cable 33 is partly wound inside the rear end of the control head 15 (Fig. 5) and is held inside a ring 35 of hard Bakelite adapted to absorb the tractional stresses, said ring being fitted and clamped over the cable 33 before the latter is fitted in the tensioning means, the clamping being provided by a set screw also made of Bakelite. With a view to executing a dust-proof closure for the control head, I provide two metal caps adapted to be unscrewed and of which one 36 carries reference marks for accurately positioning the switch 22.

The tensioning means for the feeding cable include a helical spring 38 (Figs. 1, 3, 5, 11 and 12) with closely wound convolutions and a thin walled brass tube 39 fitted inside said spring 38 and round the cable, while a helical spring 40 is fitted over the outlet of said tube and is particularly flexible. The system disclosed is rigidly anchored at its end inside a metal socket 41 provided with a threaded base which is screwed perpendicularly inside the wall of the casing of the control head 15. The cable 33 passing inside the tensioning means leads through a slightly bent curve into the iron connection box 42 and by reason of this perfect guiding, it acts in a perfectly reliable manner during the ironing and the operator is under the delusion that no current-feeding cable is actually present. During the ironing, i. e. when the iron is being slightly shifted, the tensioning means bend together with the cable (Fig. 3); they accompany automatically and gradually the progression of the iron in any direction and return always with the latter into a vertical starting position. By reason of this possibility of sloping in all directions and of the automatic return of the cable tensioning means into their starting position, which may range between verticality and horizontality, the length of cable which may be required is automatically furnished and automatically compensated for while the cable is slightly tensioned and cannot become entangled (Fig. 3), without any friction, noise or mechanical wear ever appearing in practice.

For laying down the laundry iron between two ironing stages, there is provided a special iron carrier 43 matching the shape and size of the iron (Figs. 1, 2, 3). Said rotary carrier 43 includes a thick steel sheet with an asbestos layer or a plurality of asbestos layers 44 (Fig. 14) which insulate the iron with reference to the bottom of the carrier and which are covered by a corrugated metal sheet 45. It is reinforced underneath its bottom surface by a steel disc 46 and is provided with a pivot 47 the end of which is threaded. The pivoting arm 48 (Figs. 1 to 3) is secured through its rear end to the metal carrier 16 so as to pivot round its spindle. The arm 48 assumes at its thinner outer end the shape of a carrier plate on the center of which is pivotally mounted the pivot 47 for the iron carrier (Fig. 14) which revolves freely as provided by a washer 49, said arm being held fast when desired in any suitable position. The pivotally secured arm 48 may be made up a single element, as shown or may include two parts and it may pivot as well round its rear end and round its intermediate pivot and it may also be locked in any desired position. It carries thus the iron carrier 43 freely over the ironing table while its length is adjustable. With such an adjustable arrangement for the location of the iron, the latter may be located in any desired position and there is no danger of burning the linen and the ironing table.

The special laundry irons intended for use with my improved ironing station are provided (Figs. 6 to 8a) as well for housework, for industrial purposes and for craftsmen in different types and sizes with a weight ranging between 2 and 10 kg. All the laundry irons are intended for uninterrupted service and their power may be normal, special or of any desired value for more or less speedy operation. They are equipped with heating elements which do not wear and their shoes provide for a large storing of heat; they include a strong metal hood of the air cooled type, a thermometer provided with a dial for indicating the temperature inside the body of the iron, a large sized armored connection box 42, and a convenient wood handle 50 provided with a hand-protecting part 50'. A suitably shaped connecting bridge 51 made of steatite is mounted inside the connection box 42 (Figs. 8 and 8a) and carries strong connecting bars 52 so as to allow an efficient clamping of the heating element 53 onto the feed cable 33. An eye 54 adapted to absorb the tractional stresses is provided with a grounding bar while a flexible rubber sheath 55 provides for the insulation of the input into the cover of the connection box, said eye and sheath forming the last members constituting the novel connection box 42 for laundry irons. The deeply stamped metal cap forming the cover of the connection box and the two iron-carrying trunnions 56 perforated through their four surfaces to further their cooling and screwed into the hood of the iron which is also air-cooled serve for easily positioning the laundry iron on the ironing table in its raised position during the short intervals between the operative stages. The chamber containing the heating element of said iron is closed by means of special nuts 57 and sealed.

The ironing station which has been described and which is associated with the current-feeding rail on the table 1 (Figs. 1 to 3) is exclusively adapted for mounting on a separate ironing table 1 (Figs. 1 to 3). The same station, when associated with the current-feeding rail 1' illustrated in Fig. 5, is, in contradistinction, suitable both for mounting on a separate table and for the equipment of a group of ironing tables. These stations may be mounted at distances of 1.30 to 1.50 metres from one another. They may include a feeding rail 1' (Fig. 5) for service on one side in the case of collective ironing tables of a simple breadth, or else, in the case of collective ironing tables of a double breadth (Figs. 9 and 10) as often required when there is not enough room, a double current-feeding rail 1'' (Figs. 9 and 10) may be used for service on both sides. These double current feeding rails 1'' trough which the collective ironing tables of double breadth acquire a certain rigidity correspond in their execution exactly to the current feeding rail 1' (Fig. 5) with the sole difference that said rails 1'' (Figs. 9 and 10) extend lengthwise throughout the breadth of the group of ironing tables and are provided for supporting at each end such an ironing station. The double current-feeding rails are secured to the ironing table in the same manner as in the case of the current-feeding rail 1' of Fig. 5. The connection between said stations and the group of ironing tables illustrated in Figs. 9 and 10 is a very advantageous arrangement, according to which the main and auxiliary current-feeding wires illustrated in Fig. 10 as independent leads, are fitted inside steel tubes with auxiliary circuit-breakers $f$ (Fig. 9) underneath the body of the ironing table. A main switch C is associated with the main circuit-breaker F and a tell-tale lamp which is not illustrated is mounted on a board secured to the wall or directly to the head of the ironing table, the current being fed towards the ironing table and being switched off when required after the work has been finished.

The ironing station intended for household use and illustrated in Figs. 11 and 12, is executed with a view to its being transiently secured to any table edge. In order to reduce its cost price, the current-feeding rail and the conical contact heads on the control head are omitted in such a station. The metal support 52 forms then the sole securing means for the table and serves as a carrier for the whole station. An independent rubber-coated cable feeds the current to the control head 15 and is provided with a current-feeding plug and a double jack while a corresponding connecting socket 59 is provided on the control head 15. The iron-carrying arm 48 (Figs. 11 to 13) which may be made of a single part without any intermediate pivotal connection, is similar to that of the industrial station referred to and is mounted on a metal support 58 along the central guiding axis so as to pivot between two friction disks, the arm being secured in any desired position by the six-sided nut 60 (Figs. 11 and 12). The control head 15, in contradistinction, includes a metal support 61 provided with a blind hole fitted over the end of the spindle passing out of the support 58 on which said control head may be angularly adjustable and locked in any desired position by the winged nut 62 (Figs. 11 and 12).

In particular cases, this domestic appliance is mounted directly on the ironing table T as shown in Figs. 15, 16 and 17. The ironing station which is thus portable to a certain extent, rests on an air-cooled support 63 assuming a suitable shape and the bottom of which carries a heavy plate compensating the traction exerted by the tensioned cable. The control head 15a of said station is fed also with current through a separate rubber sheathed cable provided with a double jack adapted to engage a plug carried by the control head 15a. The ends of the supply wires, as may be required for connection with the mains, extend through the rear cover 37 of the control head in which is provided a recess housing a plug 64. The control head 15a is adjustably mounted through a cylindrical pivot on a conical metal support 61 which is screwed over the support 63; the control head may thus be locked in any desired position through the winged nut 62 or else, it may be raised as required. The iron carrier 43 is mounted on three feet 65 which are specially cut so as to reduce the transfer of heat and which are rigidly screwed into the support 63. For particular conditions of household work, it is necessary to provide special tensioning means for the cable so as to make the iron independent of the actual ironing station. These tensioning means and also the plug fitted in a recess of the rear cover of the control head for feeding current to the iron 34 allow thus connecting in a simple manner any iron with the ironing station or else, the disconnection of the iron after use. The said tensioning means are provided, in contradistinction with the similar arrangements of Figs. 1, 3, 5, 11 and 12 no longer with a thin-walled metal tube 39 but with a solid rigid cylindrical steel rod 39a on which are fitted with a clearance three specially shaped rubber clamping members 66 provided with a laterally slotted guiding channel for the cable 33 at a small distance therefrom. The outer end of said rod carries a part spherical rubber socket 67 in which is formed through casting a guiding channel for the cable 33, said channel being longitudinally slotted along its upper generating line and extending obliquely with reference to the vertically directed socket axis. The cable feeding the iron may thus be introduced downwardly through the slot in the guiding channel of the socket 67 and then laterally between the slots in the guiding channels of the three rubber clamps 66 engaging the cylindrical rod 39a and the jack is mounted on the cable through a small loop and engages the plug 68 mounted in the rear cover 37 of the control head 15a. The rubber clamps 66 and the socket 67 provide, by reason of their execution, an excellent insulated clamping of the cable together with a perfect release of all tensioning stresses, while the introduction and removal of the cable is very simple and very convenient and facilitates the removable connection with any laundry iron in the station.

Otherwise, the execution, the object and the purpose of this domestic ironing station are exactly similar to what has been described for the stations designed for industrial purposes.

The advantages obtained with my improved ironing station, whether domestic or industrial, are obvious and require no further disclosure.

The embodiments and applications described and illustrated may, of course, be modified within the scope of accompanying claims, in particular as concerns the shape, the size and other features of said embodiments.

What I claim is:

1. The combination, with ironing table structure, of ironing station means and means securing said ironing station means to the said table structure, each said ironing station means comprising each an element having a flat surface, said means securing said ironing station means to said table including, means securing said element to said table structure with said flat surface in an engagement with an upper surface portion of said table structure, a hollow cylindrical control head, a pair of conductors securing said control head to said element with the axis of said control head in substantial parallelism with the upper surface of said element, a socket projecting from said control head, a tube, a spring surrounding said tube and securing the latter to said socket, a pair of electric conductors having each a portion extending through said tube and connected with each one of the first mentioned conductors, support means secured to said table structure in proximity to said element, supporting arm structure pivotally secured to said support means and laundry iron receiving means carried by said supporting arm structure, said spring being arranged to urge said tube to extend from said socket with its axis in registry with the axis of said socket.

2. A combination of the type set forth in claim 1, which includes a pair of current supply wires and in which the conductors each include a socket in circuit with one of said wires and conducting structure extending from said head and separably secured to said sockets and in circuit with the pair of electric conductors extending through said tube.

3. A combination of a type set forth in claim 2, in which said control head includes a switch for controlling the flow of current through said conductors and a tell tale lamp in circuit with said switch.

4. A combination of the type set forth in claim 3, in which a shunt member is located in said control head and connected to said switch, to said tell tale lamp and to one of the conductors extending through said tube.

5. The combination, with a group of ironing tables, of a connecting member extending from one table to another and secured to each one thereof, an ironing station positioned above each table and laundry iron supporting means at each station, each of said stations including a hollow cylindrical control head having its axis overlying and substantially parallel with an underlying portion of said connecting member, a pair of conductors connecting said control head to said underlying portion, a socket projecting from the upper surface of said control head, a tube, a spring supporting said tube and yieldingly connecting said tube to said socket, a pair of electric conductors each extending and projecting said tube and connected each to one of the conductors connected to said control head; and each of said iron supporting means comprising an element projecting from the first mentioned connecting member, an arm structure pivotally secured to said element and iron receiving member carried by said arm structure.

6. A combination of the type set forth in claim 5, which includes a circuit supply source for each station, and in which the conductors of each pair include a socket connected to said current supply source and a pair of members each projecting from said control head into one of said sockets and connected to one of the conductors extending through the associated tube.

7. A combination of a type set forth in claim 6, which includes a tell-tale lamp mounted in each control head and a switch for controlling current through the lamp and the conductors extending through the associated tube.

8. A combination of a type set forth in claim 7, in which a shunt member is located in each control head and is connected to the associated switch, tell-tale lamp, and one of the conductors extending through the associated tube.

References Cited in the file of this patent

UNITED STATES PATENTS

| | | |
|---|---|---|
| 1,527,914 | Payne | Feb. 24, 1925 |
| 1,681,291 | Glass | Aug. 21, 1928 |
| 1,738,514 | Balthaser | Dec. 10, 1929 |
| 1,935,771 | Feurstein | Nov. 21, 1933 |
| 2,047,060 | Craig | July 7, 1936 |
| 2,203,962 | Lamb | June 11, 1940 |
| 2,231,895 | Foster | Feb. 18, 1941 |
| 2,472,244 | Brady | June 7, 1949 |
| 2,513,080 | Burtt | June 27, 1950 |
| 2,592,989 | Wilson | Apr. 15, 1952 |

FOREIGN PATENTS

| | | |
|---|---|---|
| 632,326 | Great Britain | Nov. 21, 1949 |